(12) United States Patent
Li et al.

(10) Patent No.: US 9,420,565 B2
(45) Date of Patent: Aug. 16, 2016

(54) METHOD AND DEVICE FOR TRANSMITTING DATA IN NON-SCHEDULED MANNER

(71) Applicant: Huawei Technologies Co., Ltd., Shenzhen, Guangdong (CN)

(72) Inventors: Yue Li, Shenzhen (CN); Bin Zhen, Shenzhen (CN); Song Zhu, Shenzhen (CN); Zhenxing Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 14/329,302

(22) Filed: Jul. 11, 2014

(65) Prior Publication Data

US 2014/0348122 A1  Nov. 27, 2014

Related U.S. Application Data

(63) Continuation of application No. PCT/CN2013/070206, filed on Jan. 8, 2013.

(30) Foreign Application Priority Data

Jan. 11, 2012 (CN) .......................... 2012 1 0008601

(51) Int. Cl.
*H04W 72/04* (2009.01)
*H04W 76/02* (2009.01)
*H04W 74/08* (2009.01)
*H04W 56/00* (2009.01)

(52) U.S. Cl.
CPC .............. *H04W 72/04* (2013.01); *H04W 76/02* (2013.01); *H04W 56/0045* (2013.01); *H04W 72/0406* (2013.01); *H04W 74/0833* (2013.01)

(58) Field of Classification Search
None
See application file for complete search history.

(56) References Cited

U.S. PATENT DOCUMENTS 8,170,570 B2 * 5/2012 Park .................. H04W 74/0866
455/450
8,570,956 B2 * 10/2013 Park .................... H04W 74/006
370/252

(Continued)

FOREIGN PATENT DOCUMENTS

CN 101282575 A 10/2008
CN 101516125 A 8/2009

(Continued)

*Primary Examiner* — Anh Ngoc Nguyen
(74) *Attorney, Agent, or Firm* — Leydig, Voit & Mayer, Ltd.

(57) ABSTRACT

The present invention discloses a method and a device for transmitting data. The method includes: sending, by a base station, a time-frequency resource on which a communication equipment sends any one preamble to the base station on a physical random access channel and corresponding relationship between a physical random access feedback channel and a physical random access channel to a user equipment on a downlink resource through system broadcast; sending, by the communication equipment, any one preamble to the base station on the time-frequency resource, receiving random access feedback information sent by the base station, performing synchronization with the base station through a TA carried in the random access feedback information, sending an RRC connection request message to the base station on the time-frequency resource biased with a preset time, receiving an RRC establishment message sent by the base station, and then establishing an RRC connection with the base station.

16 Claims, 3 Drawing Sheets

(56) References Cited

U.S. PATENT DOCUMENTS

| | | |
|---|---|---|
| 2011/0128883 A1 | 6/2011 | Chung et al. |
| 2012/0218987 A1 | 8/2012 | Zhao et al. |
| 2012/0275390 A1* | 11/2012 | Korhonen ......... H04W 74/006 370/329 |

FOREIGN PATENT DOCUMENTS

| | | |
|---|---|---|
| CN | 101772182 A | 7/2010 |
| CN | 101808329 A | 8/2010 |
| CN | 102014476 A | 4/2011 |
| CN | 102231917 A | 11/2011 |

* cited by examiner

METHOD AND DEVICE FOR TRANSMITTING DATA IN NON-SCHEDULED MANNER

CROSS-REFERENCE TO RELATED APPLICATIONS

This application is a continuation of International Patent Application No. PCT/CN2013/070206, filed on Jan. 8, 2013, which claims priority to Chinese Patent Application No. 201210008601.8, filed on Jan. 11, 2012, both of which are hereby incorporated by reference in their entireties.

TECHNICAL FIELD

The present invention relates to the field of communication systems and, in particular, to a method and a device for transmitting data.

BACKGROUND

The Internet of Things (M2M) is very widely used, and it requires several necessary conditions for its large-scale development, one of which is the reduction of terminal (communication equipment) cost. In addition to reducing radio-frequency bandwidth, there are also a large number of complex functions for processing data, which results in the increase of cost. The system can be redesigned for the communication equipment, so as to avoid designing functions with high complexity for the terminal, thereby reducing the cost of the communication equipment chip.

The communication equipment will monitor a synchronization signal on six central PRBs (Physical Resource Block) of the frequency band after starting up, and then also read a PBCH (Physical Broadcast Channel) on the six central PRBs of the frequency band. After bandwidth, and PHICH (Physical Hybrid HARQ Indicator Channel, automatic repeat HARQ feedback indicator channel) configuration information is obtained, a PDCCH (Physical Downlink Control Channel) can be monitored. The subsequent system broadcast, transmitting and receiving of data, and so on are all scheduled by the PDCCH. However, due to the high speed of data transmission, the communication equipment will perform PDCCH blind detection on the full spectrum band of each subframe, and for each blind detection, the blind detection may reach a maximum of more than 40 times, thereby resulting in high cost and high complexity of the communication equipment.

SUMMARY

Embodiments of the present invention provide a method and a device for transmitting data, so as to reduce cost and complexity of the communication equipment during data transmission.

The technical solutions adopted by embodiments of the present invention are as follows:

In one aspect, a method for transmitting data is provided, including:

receiving, by a communication equipment, a time-frequency resource and a corresponding relationship between a physical random access feedback channel and a physical random access channel which are sent by a base station through system broadcast on a downlink resource, the time-frequency resource is a time-frequency resource on which the communication equipment sends any one preamble to the base station on the physical random access channel, and the downlink resource is a dedicated resource of the communication equipment which is indicated by the base station through a physical broadcast channel;

sending, by the communication equipment, any one preamble to the base station on the time-frequency resource, and then receiving random access feedback information sent by the base station on the physical random access feedback channel corresponding to the physical random access channel, where the physical random access feedback channel is obtained by the communication equipment according to the corresponding relationship between the physical random access feedback channel and the physical random access channel;

performing, by the communication equipment, synchronization with time of the base station through a timing advance (TA) carried in the random access feedback information, and then sending a radio resource control (RRC) connection request message to the base station on a time-frequency resource biased with a preset time; and receiving, by the communication equipment, an RRC establishment message sent by the base station on a downlink data channel in the downlink resource, and then establishing an RRC connection with the base station.

In one aspect, a device for transmitting data is provided, including:

a transmitting-receiving unit, configured to receive a time-frequency resource and a corresponding relationship between a physical random access feedback channel and a physical random access channel which are sent by a base station through system broadcast on a downlink resource, the time-frequency resource is a time-frequency resource on which the transmitting-receiving unit sends any one preamble to the base station on the physical random access channel, and the downlink resource is a dedicated resource of a communication equipment which is indicated by the base station through a physical broadcast channel;

the transmitting-receiving unit is further configured to send any one preamble to the base station on the time-frequency resource, and then receive random access feedback information sent by the base station on the physical random access feedback channel corresponding to the physical random access channel;

a synchronizing-transmitting unit, configured to perform synchronization with time of the base station through a timing advance (TA) carried in the random access feedback information received by the transmitting-receiving unit, and then send a radio resource control (RRC) connection request message to the base station on a time-frequency resource biased with a preset time;

the transmitting-receiving unit is further configured to receive an RRC establishment message sent by the base station on a downlink data channel in the downlink resource; and an establishing unit, configured to establish an RRC connection with the base station after the transmitting-receiving unit receives the RRC establishment message sent by the base station.

In one aspect, a method for transmitting data is provided, including:

sending, by a base station, a time-frequency resource and a corresponding relationship between a physical random access feedback channel and a physical random access channel to a communication equipment on a downlink resource through system broadcast, the time-frequency resource is a time-frequency resource on which the communication equipment sends any one preamble to the base station on the physical random access channel, and the downlink resource is a dedicated resource of the communication equipment which is indicated by the base station through a physical broadcast channel;

receiving, by the base station, any one preamble sent by the communication equipment on the time-frequency resource, and then sending random access feedback information to the communication equipment on the physical random access feedback channel corresponding to the physical random access channel, where the physical random access feedback channel is obtained by the communication equipment according to the corresponding relationship between the physical random access feedback channel and the physical random access channel;

receiving, by the base station, a radio resource control (RRC) connection request message sent by the communication equipment on a time-frequency resource biased with a preset time; and sending, by the base station, an RRC establishment message to the communication equipment on a downlink data channel in the downlink resource, and then establishing a connection with the communication equipment.

In one aspect, a device for transmitting data is provided, including:

a transmitting-receiving unit, configured to send a time-frequency resource and a corresponding relationship between a physical random access feedback channel and a physical random access channel to a communication equipment on a downlink resource through system broadcast, the time-frequency resource is a time-frequency resource on which the communication equipment sends any one preamble to a base station on the physical random access channel, and the downlink resource is a dedicated resource of a communication equipment which is indicated by the base station through a physical broadcast channel;

the transmitting-receiving unit is further configured to receive any one preamble sent by the communication equipment on the time-frequency resource of the physical random access channel, and then send random access feedback information to the communication equipment on the physical random access feedback channel corresponding to the physical random access channel;

the transmitting-receiving unit is further configured to receive a radio resource control (RRC) connection request message which is sent by the communication equipment to the transmitting-receiving unit on a time-frequency resource biased with a preset time;

the transmitting-receiving unit is further configured to send an RRC establishment message to the communication equipment on a downlink data channel in the downlink resource; and an establishing unit, configured to establish a connection with the communication equipment after the user equipment receives the RRC establishment message sent by the transmitting-receiving unit.

In the method and device for transmitting data according to embodiments of the present invention, firstly, the base station sends configuration information of a physical random access feedback channel and a physical random access channel to the user equipment on the downlink resource through system broadcast; after that, the communication equipment sends any one preamble to the base station on the time-frequency resource of the physical random access channel, and then receives random access feedback information sent by the base station on the physical random access feedback channel corresponding to the physical random access channel, performs synchronization with the base station through a timing advance (TA) carried in the random access feedback information, and sends a radio resource control (RRC) connection request message to the base station on the time-frequency resource biased with a preset time; finally, the communication equipment receives an RRC establishment message sent by the base station on a downlink data channel in the downlink resource, and then establishes an RRC connection with the base station. The prior art applies only to high-speed data transmission, and since the communication equipment will perform PDCCH blind detection on the full spectrum band of each subframe, and for each blind detection, the blind detection may reach a maximum of more than 40 times, high cost and high complexity of the communication equipment are caused. In embodiments of the present invention, the data transmission is performed through a non-scheduled manner, thereby reducing the cost and complexity of the communication equipment.

BRIEF DESCRIPTION OF DRAWINGS

To describe technical solutions in embodiments of the present invention more clearly, the following briefly describes the accompanying drawings required in the description of embodiments or the prior art; apparently, the accompanying drawings illustrate only some exemplary embodiments of the present invention, and those skilled in the art can derive other drawings from these drawings without creative efforts.

DESCRIPTION OF EMBODIMENTS

The technical solutions in embodiments of the present invention are described clearly and comprehensively with reference to the accompanying drawings; apparently, the embodiments described are only some exemplary embodiments of the present invention, rather than all embodiments. Other embodiments derived by those skilled in the art on the basis of embodiments of the present invention without any creative effort fall within the protection scope of the present invention.

In order to make the advantages of technical solutions of the present invention more clear, the present invention is described in detail with reference to the accompanying drawings and embodiments.

Figure 1:
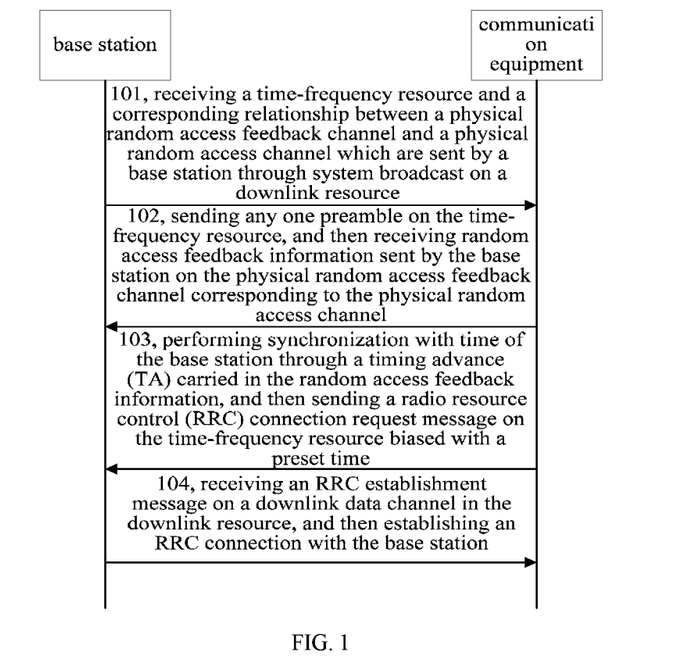
FIG. 1 is a flowchart of a method for transmitting data according to an embodiment of the present invention.

An embodiment of the present invention provides a method for transmitting data, as shown in FIG. 1, the method includes:

101, a communication equipment receives a time-frequency resource and a corresponding relationship between a physical random access feedback channel and a physical random access channel which are sent by a base station through system broadcast on a downlink resource.

Where, the time-frequency resource is a time-frequency resource on which the communication equipment sends any one preamble to the base station on the physical random access channel, and the downlink resource is a dedicated resource of the communication equipment which is indicated by the base station through a physical broadcast channel. The downlink resource may be a dedicated frequency band which is continuous in a period of time, and may also be some subframes which are discontinuous in time, or a plurality of frequency bands which are discontinuous in frequency with frequency hopping according to a certain pattern, or a combination of the both.

102, the communication equipment sends any one preamble to the base station on the time-frequency resource, and then receives random access feedback information sent by the base station on the physical random access feedback channel corresponding to the physical random access channel.

Where, the physical random access feedback channel is obtained by the communication equipment according to the corresponding relationship between the physical random access feedback channel and the physical random access channel.

103, the communication equipment performs synchronization with time of the base station through a timing advance (TA) carried in the random access feedback information, and then sends a radio resource control (RRC) connection request message to the base station on the time-frequency resource biased with a preset time.

Where, the TA is a slight bias adjustment of the transmission time due to the distance to the base station. After the communication equipment sends the preamble to the base station, the base station calculates the timing advance (TA) of sending uplink data by the communication equipment according to the arrival time of the preamble, and notifies this TA to the communication equipment through the random access feedback information, the communication equipment performs synchronization adjustment with the base station according to the TA. The preset time is determined according to the corresponding relationship between the time where the physical random access channel resource on which the communication equipment sends the preamble is in and the time at which the random access feedback information is returned.

104, the communication equipment receives an RRC establishment message sent by the base station on a downlink data channel in the downlink resource, and then establishes an RRC connection with the base station.

Specifically, firstly, the communication equipment receives the RRC establishment message sent by the base station on the downlink data channel in the downlink resource; after that, the communication equipment sends any one preamble to the base station on the time-frequency resource, and then receives the random access feedback information which is fed back by the base station on the physical random access feedback channel corresponding to the physical random access channel; finally, the communication equipment performs synchronization with the time of the base station through the timing advance (TA) carried in the random access feedback information, and then sends a radio resource control (RRC) connection establishment success message to the base station on the time-frequency resource biased with the preset time.

Optionally, after the step 104, the method may further include:

the communication equipment sends any one preamble to the base station on the time-frequency resource, and then receives the random access feedback information which is fed back by the base station on the physical random access feedback channel corresponding to the physical random access channel; after that, the communication equipment performs synchronization with the time of the base station through the timing advance (TA) carried in the random access feedback information, and then sends uplink data to the base station on the time-frequency resource biased with the preset time.

Further, the communication equipment receives downlink data which is sent by the base station and corresponds to the communication equipment, and the downlink data is identified through assigning a cell-radio network temporary identifier (C-RNTI) corresponding to the user equipment for the communication equipment in the RRC by the base station. When a group of communication equipments needs to be upgraded or configured uniformly, the downlink data may also be identified through assigning uniformly a group G-RNTI for a group of communication equipments in the RRC by the base station.

In this embodiment, the base station can learn the uplink channel quality of the communication equipment by using the process of sending the preamble in the uplink by the communication equipment, so as to make the uplink data transmission more suitable for the channel condition, thereby improving the transmission efficiency. The specific method is: grouping the preambles, dividing the general value range of the possible power ($P_{PRACH}$) of transmitting the preamble by the communication equipment into several quantization levels according to the size of the cell, and each level corresponds to a group of preambles. The base station can calculate the sending power range of the communication equipment through the $P_{PRACH}$ corresponding to the received preamble. When the $P_{PRACH}$ corresponding to the preamble of the communication equipment rises, the sending power of the preamble is calculated for each time according to the formula: $P_{PRACH}(n)$=min {Pmax, PREAMBLE_RECEIVED_TARGET_POWER+delta (n)}_[dBm], n=1 . . . k, delta (1)=PL. Where, the Pmax is the maximum sending power of the communication equipment, the delta (n) is a power offset for each rising, and the n represents the number of times of rising. The PREAMBLE_RECEIVED_TARGET_POWER is a fixed value which is configured by the base station through system broadcast. The PL is the path loss. The base station calculates uplink channel fading according to the actual power of the preamble received on the physical random access channel and the theoretical sending power corresponding to the preamble, thereby adjusting the modulation coding scheme of the channel transmission properly.

Alternatively, the sending power of the preamble is calculated for each time according to the formula: $P_{PRACH}(n)$=min{Pmax, PREAMBLE_RECEIVED_TARGET_POWER+delta (n)}_[dBm], n=1 . . . k, delta (1)=PL. Where, the Pmax is the maximum sending power of the communication equipment, the delta (n) is a power offset for each rising, and the n represents the number of times of rising. The PREAMBLE_RECEIVED_TARGET_POWER is a fixed value which is configured by the base station through system broadcast. The PL is the path loss. Then the possible range of the delta is grouped and these groups correspond to different preamble groups, and the communication equipment sends the preamble in the group which corresponds to the group of delta range that the UE uses. The base station can calculate the sending power of the communication equipment through the PL corresponding to the received preamble, and estimate and adjust the modulation coding scheme of the communication equipment based on this and combined with a signal noise ratio of the preamble.

Alternatively, the preambles are grouped, and the general value range of the downlink PL (path loss) is divided into several quantization levels according to the size of the cell, and each level corresponds to a group of preambles. The communication equipment can measure the downlink PL according to the downlink pilot, and select corresponding the appropriate preamble based on this. The base station estimates and adjusts the modulation coding scheme of the channel transmission on the basis of the PL corresponding to the received preamble. This method can be used for downlink transmission, in order to obtain a more accurate downlink channel state, after the power of sending the preamble rises, the communication equipment can still select the preamble according to the obtained PL. In the case that the reciprocity of the uplink and downlink is better, the method can also be used for uplink transmission.

Figure 2:
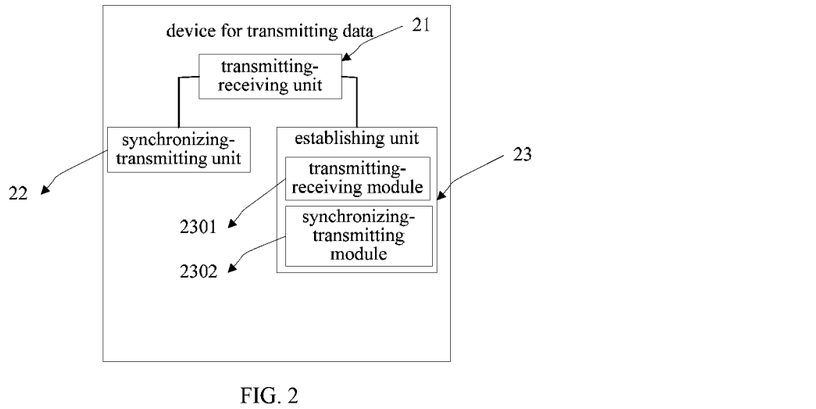
FIG. 2 is a schematic structural diagram of a device for transmitting data according to an embodiment of the present invention.

An embodiment of the present invention provides a device for transmitting data, as shown in FIG. 2, the device includes a transmitting-receiving unit 21, a synchronizing-transmitting unit 22 and an establishing unit 23.

The transmitting-receiving unit 21 is configured to receive a time-frequency resource and a corresponding relationship between a physical random access feedback channel and a physical random access channel which are sent by a base station through system broadcast on a downlink resource.

Where, the time-frequency resource is a time-frequency resource on which the transmitting-receiving unit sends any one preamble to the base station on the physical random access channel, and the downlink resource is a dedicated resource of the communication equipment which is indicated by the base station through a physical broadcast channel. The downlink resource may be a dedicated frequency band which is continuous in a period of time, and may also be some subframes which are discontinuous in time, or a plurality of frequency bands which are discontinuous in frequency with frequency hopping according to a certain pattern, or a combination of the both.

The transmitting-receiving unit 21 is also configured to send any one preamble to the base station on the time-frequency resource of the physical random access channel, and then receive random access feedback information sent by the base station on the physical random access feedback channel corresponding to the physical random access channel.

The transmitting-receiving unit 21 is also configured to receive an RRC establishment message sent by the base station on a downlink data channel in the downlink resource.

The transmitting-receiving unit 21 is also configured to receive downlink data which is sent by the base station and corresponds to the communication equipment.

Where, the downlink data is identified through assigning a cell-radio network temporary identifier (C-RNTI) corresponding to the user equipment for the communication equipment in the RRC by the base station. When a group of communication equipments needs to be upgraded or configured uniformly, the downlink data may also be identified through assigning uniformly a group G-RNTI for a group of communication equipments in the RRC by the base station.

The synchronizing-transmitting unit 22 is configured to perform synchronization with time of the base station through a timing advance (TA) carried in the random access feedback information received by the transmitting-receiving unit 21, and then send a radio resource control (RRC) connection request message to the base station on the time-frequency resource biased with a preset time.

Where, the TA is a slight bias adjustment of the transmission time due to the distance to the base station. After the communication equipment sends the preamble to the base station, the base station calculates the timing advance (TA) of sending uplink data by the communication equipment according to the arrival time of the preamble, and notifies this TA to the communication equipment through the random access feedback information, the communication equipment performs synchronization adjustment with the base station according to the TA. The preset time is determined according to the corresponding relationship between the time where the physical random access channel resource on which the communication equipment sends the preamble is in and the time at which the random access feedback information is returned.

The synchronizing-transmitting unit 22 is also configured to perform synchronization with time of the base station through the timing advance (TA) carried in the random access feedback information, and then send uplink data to the base station on the time-frequency resource biased with a preset time.

The establishing unit 23 is configured to establish an RRC connection with the base station after the transmitting-receiving unit receives the RRC establishment message sent by the base station.

The establishing unit 23 includes a transmitting-receiving module 2301 and a synchronizing-transmitting module 2302.

The transmitting-receiving module 2301 is configured to receive the RRC establishment message sent by the base station on the downlink data channel in the downlink resource.

The transmitting-receiving module 2301 is also configured to send any one preamble to the base station on the time-frequency resource, and then receive the random access feedback information sent by the base station on the physical random access feedback channel corresponding to the physical random access channel.

The synchronizing-transmitting module 2302 is configured to perform synchronization with the time of the base station through the timing advance (TA) carried in the random access feedback information, and then send a radio resource control (RRC) connection establishment success message to the base station on the time-frequency resource biased with the preset time.

In this embodiment, the base station can learn the uplink channel quality of the communication equipment by using the process of sending the preamble in the uplink by the communication equipment, so as to make the uplink data transmission more suitable for the channel condition, thereby improving the transmission efficiency. The specific method is similar to the method shown in FIG. 1, which will not be repeated here.

Figure 3:
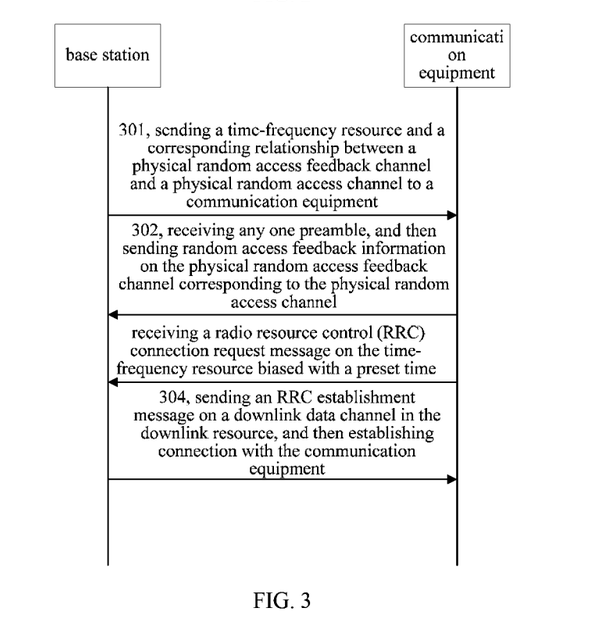
FIG. 3 is a flowchart of a method for transmitting data according to another embodiment of the present invention.

This embodiment of the present invention provides another method for transmitting data, as shown in FIG. 3, the method includes:

301, a base station sends a time-frequency resource and corresponding relationship between a physical random access feedback channel and a physical random access channel to a communication equipment on a downlink resource through system broadcast.

Where, the time-frequency resource is a time-frequency resource on which the communication equipment sends any one preamble to the base station on the physical random access channel, and the downlink resource is a dedicated resource of the communication equipment which is indicated by the base station through a physical broadcast channel. The downlink resource may be a dedicated frequency band which is continuous in a period of time, and may also be some subframes which are discontinuous in time, or a plurality of frequency bands which are discontinuous in frequency with frequency hopping according to a certain pattern, or a combination of the both.

302, the base station receives any one preamble sent by the communication equipment on the time-frequency resource, and then sends random access feedback information to the communication equipment on the physical random access feedback channel corresponding to the physical random access channel.

Where, the physical random access feedback channel is obtained by the communication equipment according to the corresponding relationship between the physical random access feedback channel and the physical random access channel.

303, the base station receives a radio resource control (RRC) connection request message sent by the communication equipment on the time-frequency resource biased with a preset time.

304, the base station sends an RRC establishment message to the communication equipment on a downlink data channel in the downlink resource, and then establishes a connection with the communication equipment.

Specifically, the base station sends the RRC establishment message to the communication equipment on the downlink data channel in the downlink resource; after that, the base station receives any one preamble sent by the communication equipment on the time-frequency resource, and then sends the random access feedback information to the communication equipment on the physical random access feedback channel corresponding to the physical random access channel; finally, the base station receives an RRC connection establishment success message which is sent by the communication equipment to the base station on the time-frequency resource biased with the preset time.

Optionally, after the step 304, the method may further include: the base station receives any one preamble sent by the communication equipment on the time-frequency resource, and then feeds back the random access feedback information to the communication equipment on the physical random access feedback channel corresponding to the physical random access channel; after that, the base station receives uplink data which is sent by the communication equipment to the base station on the time-frequency resource biased with the preset time. When the base station sends downlink data corresponding to the communication equipment to the communication equipment, the downlink data corresponding to the communication equipment is identified through assigning a cell-radio network temporary identifier (C-RNTI) corresponding to the user equipment for the communication equipment in the RRC by the base station. When a group of communication equipments needs to be upgraded or configured uniformly, the downlink data may also be identified through assigning uniformly a group G-RNTI for a group of communication equipments in the RRC by the base station.

In this embodiment, the base station can learn the uplink channel quality of the communication equipment by using the process of sending the preamble in the uplink by the communication equipment, so as to make the uplink data transmission more suitable for the channel condition, thereby improving the transmission efficiency. The specific method is similar to the method shown in FIG. 1, which will not be repeated here.

Figure 4:
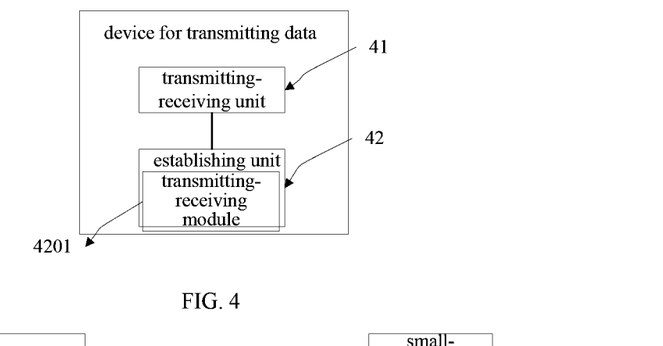
FIG. 4 is a schematic structural diagram of a device for transmitting data according to another embodiment of the present invention.

This embodiment of the present invention provides another device for transmitting data, as shown in FIG. 4, the device includes a transmitting-receiving unit 41 and an establishing unit 42.

The transmitting-receiving unit 41 is configured to send a time-frequency resource and a corresponding relationship between a physical random access feedback channel and a physical random access channel to a communication equipment on a downlink resource through system broadcast.

Where, the time-frequency resource is a time-frequency resource on which the transmitting-receiving unit sends any one preamble to the base station on the physical random access channel, and the downlink resource is a dedicated resource of the communication equipment which is indicated by the base station through a physical broadcast channel.

The transmitting-receiving unit 41 is also configured to receive any one preamble sent by the communication equipment on the time-frequency resource, and then send random access feedback information to the communication equipment on the physical random access feedback channel corresponding to the physical random access channel.

The transmitting-receiving unit 41 is also configured to receive a radio resource control (RRC) connection request message which is sent by the communication equipment to the transmitting-receiving unit on the time-frequency resource biased with a preset time.

The transmitting-receiving unit 41 is also configured to send an RRC establishment message to the communication equipment on a downlink data channel in the downlink resource.

The transmitting-receiving unit 41 may also be configured to receive uplink data which is sent by the communication equipment to the transmitting-receiving unit on the time-frequency resource biased with a preset time.

The transmitting-receiving unit 41 may also be configured to send downlink data corresponding to the communication equipment to the communication equipment.

Where, the downlink data corresponding to the communication equipment is identified through assigning a cell-radio network temporary identifier (C-RNTI) corresponding to the user equipment for the communication equipment in the RRC by the base station.

The establishing unit 42 is configured to establish a connection with the communication equipment after the user equipment receives the RRC establishment message sent by the transmitting-receiving unit.

The establishing unit 42 includes a transmitting-receiving module 4201.

The transmitting-receiving module 4201 is configured to send the RRC establishment message to the communication equipment on the downlink data channel in the downlink resource.

The transmitting-receiving module 4201 may also be configured to receive any one preamble sent by the communication equipment on the time-frequency resource, and then send the random access feedback information to the communication equipment on the physical random access feedback channel corresponding to the physical random access channel.

The transmitting-receiving module 4201 may also be configured to receive an RRC connection establishment success message which is sent by the communication equipment to the transmitting-receiving module on the time-frequency resource biased with the preset time.

In this embodiment, the base station can learn the uplink channel quality of the communication equipment by using the process of sending the preamble in the uplink by the communication equipment, so as to make the uplink data transmission more suitable for the channel condition, thereby improving the transmission efficiency. The specific method is similar to the method shown in FIG. 1, which will not be repeated here.

Figure 5:
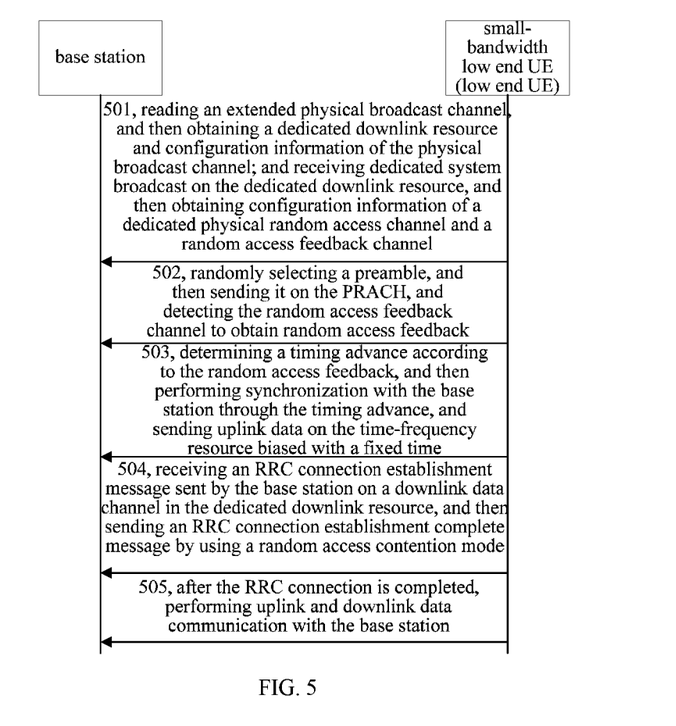
FIG. 5 is a flowchart of a method for transmitting data according to still another embodiment of the present invention.

Embodiments of the present invention provide another method for transmitting data, the communication equipment used in this method is a small-bandwidth low end UE (low end UE); the communication device includes but is not limited to the low end UE, as shown in FIG. 5, the method includes:

501, the low end UE reads an extended physical broadcast channel (PBCH), and then obtains a low end dedicated downlink resource and configuration information of the physical broadcast channel; and the low end UE receives dedicated system broadcast on the dedicated downlink resource, and then obtains configuration information of a dedicated physical random access channel (PRACH) and a random access feedback channel.

502, the low end UE randomly selects a preamble (preamble), and then sends it to the base station on the PRACH, and detects the random access feedback channel to obtain random access feedback (RAR).

503, the low end UE determines a timing advance according to the RAR, and then performs synchronization with the base station through the timing advance, and sends uplink data to the base station on the time-frequency resource biased with a fixed time.

Where, the uplink data may be an RRC connection request.

504, the low end UE receives an RRC connection establishment message sent by the base station on a downlink data channel in the dedicated downlink resource, and then sends an RRC connection establishment complete message to the base station by using a random access contention mode, so as to complete the RRC connection.

Where, the use of the random access contention mode is achieved by repeating the step 502 and the step 503.

505, after the RRC connection is completed, the low end UE and the base station perform uplink and downlink data communication.

Where, the sending of uplink data also needs to start from the step 502, and after the step 503 is carried out, the low end UE can send uplink data to the base station. For the receiving of downlink data, the low end UE detects in real-time on the downlink data channel in the dedicated downlink resource whether the data identified by the C-RNTI corresponding to the low end UE is contained; when there is the downlink data, the low end UE receives the downlink data.

In the method and device for transmitting data according to embodiments of the present invention, firstly, the base station sends configuration information of a physical random access feedback channel and a physical random access channel to the user equipment on the downlink resource through system broadcast; after that, the communication equipment sends any one preamble to the base station on the time-frequency resource of the physical random access channel, and then receives random access feedback information which is fed back by the base station on the physical random access feedback channel corresponding to the physical random access channel, performs synchronization with the base station through a timing advance (TA) carried in the random access feedback information, and sends a radio resource control (RRC) connection request message to the base station on the time-frequency resource biased with a preset time; finally, the communication equipment receives an RRC establishment message sent by the base station on a downlink data channel in the downlink resource, and then establishes an RRC connection with the base station. The prior art applies only to high-speed data transmission, and since the communication equipment will perform PDCCH blind detection on the full spectrum band of each subframe, and for each blind detection, the blind detection may reach a maximum of more than 40 times, high cost and high complexity of the communication equipment are caused. In embodiments of the present invention, the data transmission is performed through a non-scheduled manner, thereby reducing the cost and complexity of the communication equipment.

The device for transmitting data according to embodiments of the present invention can achieve the method embodiments described above, please refer to the description of method embodiments for the specific function realization, which will not be repeated here. The method and device for transmitting data according to embodiments of the present invention can be applied to the field of communication systems, but not limited to this.

It can be realized by those skilled in the art that, all or part of the steps in the method embodiments can be implemented by hardware under the instruction of a program. The program may be stored in a computer readable storage medium and when the program is executed, the steps in the method embodiments are executed. The storage medium may be a magnetic disk, an optical disk, a read only memory (Read-Only Memory, ROM), or a random access memory (Random Access Memory, RAM), or etc.

The above is only preferred implementing modes of the present invention, but the protection scope of the present invention is not limited to this, variations or substitutions which can be easily thought of within the technical scope disclosed by embodiments of the present invention by any person skilled in the art, should fall within the protection scope of the present invention. Accordingly, the protection scope of the present invention should be subject to the protection scope of the claims.

What is claimed is:

1. A method for transmitting data, comprising:
   receiving, by a communication equipment, a time-frequency resource and a corresponding relationship between a physical random access feedback channel and a physical random access channel which are sent by a base station through system broadcast on a downlink resource, wherein the time-frequency resource is a time-frequency resource on which the communication equipment sends any one preamble to the base station on the physical random access channel, and the downlink resource is a dedicated resource of the communication equipment which is indicated by the base station through a physical broadcast channel;
   sending, by the communication equipment, the any one preamble to the base station on the time-frequency resource, and then receiving random access feedback information sent by the base station on the physical random access feedback channel corresponding to the physical random access channel, wherein the physical random access feedback channel is obtained by the communication equipment according to the corresponding relationship between the physical random access feedback channel and the physical random access channel;
   performing, by the communication equipment, synchronization with time of the base station through a timing advance (TA) carried in the random access feedback information, and then sending a radio resource control (RRC) connection request message to the base station on a time-frequency resource biased with a preset time; and
   receiving, by the communication equipment, an RRC establishment message sent by the base station on a downlink data channel in the downlink resource, and then establishing an RRC connection with the base station.

2. The method according to claim 1, wherein the receiving, by the communication equipment, the RRC establishment message sent by the base station on the downlink data channel in the downlink resource, and then establishing the RRC connection with the base station, comprises:

receiving, by the communication equipment, the RRC establishment message sent by the base station on the downlink data channel in the downlink resource;

sending, by the communication equipment, the any one preamble to the base station on the time-frequency resource, and then receiving the random access feedback information sent by the base station on the physical random access feedback channel corresponding to the physical random access channel; and performing, by the communication equipment, the synchronization with the time of the base station through the TA carried in the random access feedback information, and then sending an RRC connection establishment success message to the base station on the time-frequency resource biased with the preset time.

3. The method according to claim 1, wherein after the receiving, by the communication equipment, the RRC establishment message sent by the base station on the downlink data channel in the downlink resource, and then establishing the RRC connection with the base station, the method further comprises:

sending, by the communication equipment, the any one preamble to the base station on the time-frequency resource, and then receiving the random access feedback information sent by the base station on the physical random access feedback channel corresponding to the physical random access channel;

performing, by the communication equipment, the synchronization with the time of the base station through the TA carried in the random access feedback information, and then sending uplink data to the base station on the time-frequency resource biased with the preset time.

4. The method according to claim 3, further comprising:

receiving, by the communication equipment, downlink data which is sent by the base station and corresponds to the communication equipment, wherein the downlink data corresponding to the communication equipment is identified through assigning a cell-radio network temporary identifier (C-RNTI) corresponding to the user equipment for the communication equipment in the RRC establishment message by the base station.

5. A method for transmitting data, comprising:

sending, by a base station, a time-frequency resource and a corresponding relationship between a physical random access feedback channel and a physical random access channel to a communication equipment on a downlink resource through system broadcast, wherein the time-frequency resource is a time-frequency resource on which the communication equipment sends any one preamble to the base station on the physical random access channel, and the downlink resource is a dedicated resource of the communication equipment which is indicated by the base station through a physical broadcast channel;

receiving, by the base station, the any one preamble sent by the communication equipment on the time-frequency resource, and then sending random access feedback information to the communication equipment on the physical random access feedback channel corresponding to the physical random access channel, wherein the physical random access feedback channel is obtained by the communication equipment according to the corresponding relationship between the physical random access feedback channel and the physical random access channel;

receiving, by the base station, a radio resource control (RRC) connection request message sent by the communication equipment on a time-frequency resource biased with a preset time; and sending, by the base station, an RRC establishment message to the communication equipment on a downlink data channel in the downlink resource, and then establishing a connection with the communication equipment.

6. The method according to claim 5, wherein the sending, by the base station, the RRC establishment message to the communication equipment on the downlink data channel in the downlink resource, and then establishing the connection with the communication equipment, comprises:

sending, by the base station, the RRC establishment message to the communication equipment on the downlink data channel in the downlink resource;

receiving, by the base station, the any one preamble sent by the communication equipment on the time-frequency resource, and then sending the random access feedback information to the communication equipment on the physical random access feedback channel corresponding to the physical random access channel;

receiving, by the base station, an RRC connection establishment success message which is sent by the communication equipment to the base station on the time-frequency resource biased with the preset time.

7. The method according to claim 5, wherein after the sending, by the base station, the RRC establishment message to the communication equipment on the downlink data channel in the downlink resource, and then establishing the connection with the communication equipment, the method further comprises:

receiving, by the base station, the any one preamble sent by the communication equipment on the time-frequency resource, and then feeding back the random access feedback information to the communication equipment on the physical random access feedback channel corresponding to the physical random access channel;

receiving, by the base station, uplink data which is sent by the communication equipment to the base station on the time-frequency resource biased with the preset time.

8. The method according to claim 7, wherein the method further comprises:

sending, by the base station, downlink data corresponding to the communication equipment to the communication equipment, wherein the downlink data corresponding to the communication equipment is identified through assigning a cell-radio network temporary identifier (C-RNTI) corresponding to the user equipment for the communication equipment in the RRC establishment message by the base station.

9. A device for transmitting data, comprising a processor and a non-transitory processor-readable medium having processor-executable instructions stored thereon, the processor-executable instructions including a plurality of units, the units including:

a transmitting-receiving unit, configured to receive a time-frequency resource and a corresponding relationship between a physical random access feedback channel and a physical random access channel which are sent by a base station through system broadcast on a downlink resource, wherein the time-frequency resource is a time-frequency resource on which the transmitting-receiving unit sends any one preamble to the base station on the physical random access channel, and the downlink resource is a dedicated resource of a communication equipment which is indicated by the base station through a physical broadcast channel;

the transmitting-receiving unit is further configured to send the any one preamble to the base station on the time-frequency resource, and then receive random access feedback information sent by the base station on the physical random access feedback channel corresponding to the physical random access channel;

a synchronizing-transmitting unit, configured to perform synchronization with time of the base station through a timing advance (TA) carried in the random access feedback information received by the transmitting-receiving unit, and then send a radio resource control (RRC) connection request message to the base station on a time-frequency resource biased with a preset time;

the transmitting-receiving unit is further configured to receive an RRC establishment message sent by the base station on a downlink data channel in the downlink resource; and an establishing unit, configured to establish an RRC connection with the base station after the transmitting-receiving unit receives the RRC establishment message sent by the base station.

10. The device according to claim 9, wherein the establishing unit comprises:

a transmitting-receiving module, configured to receive the RRC establishment message sent by the base station on the downlink data channel in the downlink resource;

the transmitting-receiving module is further configured to send the any one preamble to the base station on the time-frequency resource, and then receive the random access feedback information sent by the base station on the physical random access feedback channel corresponding to the physical random access channel; and a synchronizing-transmitting module, configured to perform synchronization with the time of the base station through the timing advance (TA) carried in the random access feedback information, and then send a radio resource control (RRC) connection establishment success message to the base station on the time-frequency resource biased with the preset time.

11. The device according to claim 9, wherein the synchronizing-transmitting module is further configured to perform synchronization with the time of the base station through the timing advance (TA) carried in the random access feedback information, and then send uplink data to the base station on the time-frequency resource biased with the preset time.

12. The device according to claim 11, wherein the transmitting-receiving unit is further configured to receive downlink data which is sent by the base station and corresponds to the communication equipment, wherein the downlink data corresponding to the communication equipment is identified through assigning a cell-radio network temporary identifier (C-RNTI) corresponding to the user equipment for the communication equipment in the RRC establishment message by the base station.

13. A device for transmitting data, comprising a processor and a non-transitory processor-readable medium having processor-executable instructions stored thereon, the processor-executable instructions including a plurality of units, the units including:

a transmitting-receiving unit, configured to send a time-frequency resource and a corresponding relationship between a physical random access feedback channel and a physical random access channel to a communication equipment on a downlink resource through system broadcast, wherein the time-frequency resource is a time-frequency resource on which the communication equipment sends any one preamble to a base station on the physical random access channel, and the downlink resource is a dedicated resource of a communication equipment which is indicated by the base station through a physical broadcast channel;

the transmitting-receiving unit is further configured to receive the any one preamble sent by the communication equipment on the time-frequency resource of the physical random access channel, and then send random access feedback information to the communication equipment on the physical random access feedback channel corresponding to the physical random access channel;

the transmitting-receiving unit is further configured to receive a radio resource control (RRC) connection request message which is sent by the communication equipment to the transmitting-receiving unit on a time-frequency resource biased with a preset time;

the transmitting-receiving unit is further configured to send an RRC establishment message to the communication equipment on a downlink data channel in the downlink resource; and an establishing unit, configured to establish a connection with the communication equipment after the user equipment receives the RRC establishment message sent by the transmitting-receiving unit.

14. The device according to claim 13, wherein the establishing unit comprises:

a transmitting-receiving module, configured to send the RRC establishment message to the communication equipment on the downlink data channel in the downlink resource;

the transmitting-receiving module is further configured to receive the any one preamble sent by the communication equipment on the time-frequency resource, and then send the random access feedback information to the communication equipment on the physical random access feedback channel corresponding to the physical random access channel; and the transmitting-receiving module is further configured to receive an RRC connection establishment success message which is sent by the communication equipment to the transmitting-receiving module on the time-frequency resource biased with the preset time.

15. The device according to claim 13, wherein the transmitting-receiving module is further configured to receive uplink data which is sent by the communication equipment to the transmitting-receiving module on the time-frequency resource biased with the preset time.

16. The device according to claim 15, wherein the transmitting-receiving module is further configured to send downlink data corresponding to the communication equipment to the communication equipment, wherein the downlink data corresponding to the communication equipment is identified through assigning a cell-radio network temporary identifier (C-RNTI) corresponding to the user equipment for the communication equipment in the RRC establishment message by the base station.

* * * * *